(12) United States Patent
Hajiloo et al.

(10) Patent No.: US 12,309,231 B1
(45) Date of Patent: May 20, 2025

(54) VEHICLE MOTION CONTROL PERFORMANCE ENHANCEMENT USING REAL-TIME DATA RELIABILITY AND CRITICALITY ASSESSMENTS

(71) Applicant: GM Global Technology Operations LLC, Detroit, MI (US)

(72) Inventors: Reza Hajiloo, Richmond Hill (CA); Mansour Ataei, Richmond Hill (CA); SeyedAlireza Kasaiezadeh Mahabadi, Novi, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 10 days.

(21) Appl. No.: 18/414,949

(22) Filed: Jan. 17, 2024

(51) Int. Cl.
*H04L 67/12* (2022.01)
*H04B 17/20* (2015.01)

(52) U.S. Cl.
CPC ........... *H04L 67/12* (2013.01); *H04B 17/203* (2023.05)

(58) Field of Classification Search
None
See application file for complete search history.

(56) References Cited

U.S. PATENT DOCUMENTS

| | | | |
|---|---|---|---|
| 6,944,544 B1 * | 9/2005 | Prakah-Asante | ... B60R 21/0134 701/45 |
| 8,645,022 B2 * | 2/2014 | Yoshimura | .......... B60L 15/2009 701/32.8 |
| 12,245,534 B2 * | 3/2025 | Sibley | .................... G05D 1/249 |
| 2007/0067085 A1 * | 3/2007 | Lu | ........................ B60W 40/114 340/440 |
| 2014/0195113 A1 * | 7/2014 | Lu | ...................... B60G 17/0165 701/37 |
| 2023/0242131 A1 * | 8/2023 | Kasaiezadeh Mahabadi | .............. G06Q 10/06311 701/29.1 |
| 2023/0311849 A1 * | 10/2023 | Raste | .................... B60W 10/04 701/22 |
| 2024/0174243 A1 * | 5/2024 | Zeng | ................... B60W 50/045 |
| 2024/0174246 A1 * | 5/2024 | Khajepour | ........ B60W 50/0097 |
| 2024/0349012 A1 * | 10/2024 | Hughes | ................ G06Q 10/047 |

OTHER PUBLICATIONS

United States Patent and Trademark Office. U.S. Appl. No. 17/824,196, filed May 25, 2022.

* cited by examiner

*Primary Examiner* — Phuoc H Nguyen
(74) *Attorney, Agent, or Firm* — Vivacqua Crane, PLLC

(57) ABSTRACT

A system for vehicle motion control (VMC) performance enhancement utilizing real-time data reliability and criticality assessments includes a vehicle having sensors and actuators. The sensors collect real-time dynamic state information about the vehicle. The actuators actively and continuously adjust the dynamic state of the vehicle. The system executes a VMC application that obtains, from the sensors and actuators, dynamic state information of the vehicle, and estimates a real-time vehicle dynamic state from the dynamic state information. The VMC application determines a signal criticality and a signal reliability for vehicle dynamic state information, and executes a VMC strategy based on the real-time vehicle dynamic state, the signal criticality and reliability. The VMC application detects and mitigates signal degradation by enacting a VMC strategy, and generates a VMC output command to the actuators based on the VMC strategy. The VMC strategy actively, continuously, and automatically adapts to seamlessly overcome signal degradation.

18 Claims, 3 Drawing Sheets

VEHICLE MOTION CONTROL PERFORMANCE ENHANCEMENT USING REAL-TIME DATA RELIABILITY AND CRITICALITY ASSESSMENTS

INTRODUCTION

The present disclosure relates to vehicle motion control, and more specifically to systems and methods for monitoring the health and degradation of vehicle motion control system components. Vehicle motion control systems are increasingly complex, as many are increasingly computer controlled and operated. Various sub-systems of vehicle motion control systems operate in complex harmony to manage vehicle performance. In many instances, several of the vehicle motion control sub-systems can be utilized to alter vehicle performance to achieve the same outcome. However, because the management of such complex multiple sub-system interactions can result in uncertainty and decreased effectiveness of each control action taken in efforts to achieve an overall objective vehicle motion control or performance function.

Accordingly, while current systems and methods for vehicle motion control achieve their intended purpose, there is a need for a new and improved system and method for vehicle emotion control that provides a robust, redundant, and reliable means of achieving an optimum vehicle motion control outcome, while providing a health monitoring and degradation mitigation for multi-actuation multi-objective vehicle motion control, and while providing a means of determining input signal criticality and monitoring and generating performance metrics for vehicle motion control sub-systems in real-time without increasing manufacturing complexity, while utilizing existing hardware, and improving customer experience.

SUMMARY

According to several aspects of the present disclosure, a system for vehicle motion control performance enhancement utilizing real-time data reliability and criticality assessments includes a vehicle, a plurality of sensors disposed on the vehicle, and a plurality of actuators disposed on the vehicle. The plurality of sensors collect real-time information about a dynamic state of the vehicle. The plurality of actuators actively and continuously adjust the dynamic state of the vehicle. The system further includes a controller having a processor, a memory, and one or more input/output (I/O) ports. The I/O ports communicate with the plurality of sensors and the plurality of actuators. The processor executes programmatic control logic stored in the memory. The programmatic control logic includes a vehicle motion control performance enhancement (VMC) application. The VMC application includes at least first, second, third, fourth, fifth, and sixth control logic portions. The first control logic obtains, from the plurality of sensors and from the plurality of actuators, the real-time information about the dynamic state of the vehicle. The second control logic estimates a real-time vehicle dynamic state from the vehicle dynamic state information. The third control logic determines a signal criticality and a signal reliability for vehicle dynamic state information. The fourth control logic executes a VMC strategy based on the real-time vehicle dynamic state, the signal criticality and the signal reliability. The fifth control logic detects and mitigates signal degradation by selectively enacting one or more alternate VMC strategies. The sixth control logic generates a VMC output command to the plurality of actuators based on the VMC strategy. The VMC strategy actively, continuously, and automatically adapts to seamlessly overcome signal degradation.

In another aspect of the present disclosure the second control logic further includes: measuring in real-time, with the plurality of sensors and the plurality of actuators, a position, a movement, and an acceleration of the vehicle in three or more degrees of freedom. Each of the real-time dynamic state estimations defines a distinct aspect of the dynamic state of the vehicle.

In another aspect of the present disclosure the third control logic further includes: determining the signal criticality based on signal sensitivity, actuator effectiveness of relevant actuators of the plurality of actuators, and importance of related performance metrics in real-time. The signal sensitivity defines a measure of how dependent the control logic for a particular actuator is upon a related control signal. The actuator effectiveness is a measure of effectiveness of a related control logic that controls the particular actuators relative to a specific performance index, and the importance of related performance metrics in real-time defines a necessity of the related performance metric at a specific instant in time. The signal criticality defines a sum of sensitivities of control methods to an input signal multiplied by a sum of effectivnesses of control methods for a vehicle performance metric, multiplied by the importance of performance metrics in real-time.

In another aspect of the present disclosure a vehicle performance metric is defined for each actuator configuration for the vehicle such that the vehicle performance metric includes one of: a no effect contribution towards a VMC objective; a contribution of limited effectiveness towards the VMC objective; and a contribution of high effectiveness towards the VMC objective. The high effectiveness is greater than the limited effectiveness, and the limited effectiveness is greater than the no effect contribution towards the VMC objective. Each actuator configuration has a specific and distinct contribution to each performance metric, and each actuator configuration defines a distinct subset of actuators equipped to the vehicle and contributes in a distinct manner to VMC.

In another aspect of the present disclosure based upon the real-time vehicle dynamic state, signal criticality, and signal reliability, the VMC application executes the fourth control logic and develops a VMC strategy that relates to current VMC objectives and the effectivenesses of control methods relative to performance metrics and associated VMC objectives. The VMC strategy ranks actuator control methods in relation to the current VMC objectives.

In another aspect of the present disclosure the fifth control logic further includes: control logic that actively, continuously, and automatically determines when a reliability of one or more input signals is equal to or below a predetermined reliability threshold for one or more input signals with a criticality equal to or above a predetermined threshold criticality value. Upon determining that the reliability of the one or more input signals is equal to or below the predetermined reliability threshold and that the criticality of the one or more input signals is equal to or above the predetermined threshold criticality value, actively, continuously, and automatically adapting by utilizing one or more alternate control methods having a reliability equal to or above the predetermined threshold for the criticality above the predetermined threshold criticality value. Upon determining that the reliability of the one or more input signals is equal to or above the predetermined reliability threshold while the criticality is equal to or above the predetermined threshold, utilizing a highest ranked control method applicable to the current VMC objectives.

In another aspect of the present disclosure fifth control logic further includes: control logic that determines that the reliability of the one or more input signals is equal to or below the predetermined reliability threshold and automatically transitions actuator control to one or more alternate actuator control methods that have decreased sensitivity to the one or more input signals that have been identified as having reliability below the predetermined reliability threshold relative to the highest-ranked control method for applicable to the current VMC objectives.

In another aspect of the present disclosure the automatic transition between highest-ranked control method and one or more alternate actuator control methods occurs automatically and instantaneously or automatically and gradually.

In another aspect of the present disclosure the sixth control logic further includes: control logic for actively, continuously, and automatically executing a fusion strategy for degradation mitigation that utilizes weighted averages of actuator control methods to define the VMC output command to the plurality of actuators. The VMC output command is calculated as:

Weight Index of a Control Method =

$$\left[\sum \begin{array}{c} \text{Sensitivity of} \\ \text{control method} \\ \text{to input signal} \end{array} \times \sum \begin{array}{c} \text{Reliability of} \\ \text{Input Signal} \end{array}\right] \times$$

$$\left[\sum \begin{array}{c} \text{Effectiveness of} \\ \text{control method} \\ \text{for performance} \\ \text{metric} \end{array} \times \sum \begin{array}{c} \text{Importance of} \\ \text{a performance} \\ \text{metric in real-time} \end{array}\right]$$

I such that:
II.

Final Actuator Control Command =

$$\frac{\sum \begin{array}{c} \text{Weight Index of a} \\ \text{Control Method} \end{array} \times \sum \begin{array}{c} \text{Output of} \\ \text{Control Method} \end{array}}{\sum \begin{array}{c} \text{Weight Index of a} \\ \text{Control Method} \end{array}}$$

where the weight index for an actuator control method is calculated by multiplying the sensitivity of the control method by the reliability of the input signal and by the effectiveness of the actuator control method for a given actuator control algorithm, and multiplied further by the importance of a performance metric in real-time.

In another aspect of the present disclosure a method for vehicle motion control performance enhancement utilizing real-time data reliability and criticality assessments includes collecting, with a plurality of sensors disposed on a vehicle, real-time information about a dynamic state of the vehicle. The method further includes actively and continuously adjusting a dynamic state of the vehicle with a plurality of actuators disposed on the vehicle. The method further includes executing programmatic control logic including a vehicle motion control performance enhancement application (VMC application) stored in memory of a controller of the vehicle, the controller having a processor, a memory, and one or more input/output (I/O) ports, the I/O ports communicating with the plurality of sensors and the plurality of actuators. The VMC application includes control logic for: obtaining, from the plurality of sensors and from the plurality of actuators, the real-time information about the dynamic state of the vehicle; for estimating a real-time vehicle dynamic state from the vehicle dynamic state information; and for determining a signal criticality and a signal reliability for vehicle dynamic state information. The VMC application further includes control logic for: executing a VMC strategy based on the real-time vehicle dynamic state, the signal criticality and the signal reliability; detecting and mitigating signal degradation by selectively enacting one or more alternate VMC strategies; and generating a VMC output command to the plurality of actuators based on the VMC strategy. The VMC strategy actively, continuously, and automatically adapts to seamlessly overcome signal degradation.

In another aspect of the present disclosure the method further includes measuring in real-time, with the plurality of sensors and the plurality of actuators, a position, a movement, and an acceleration of the vehicle in three or more degrees of freedom. Each of the real-time dynamic state estimations defines a distinct aspect of the dynamic state of the vehicle.

In another aspect of the present disclosure the method further includes determining the signal criticality based on signal sensitivity, actuator effectiveness of relevant actuators of the plurality of actuators, and importance of related performance metrics in real-time. The signal sensitivity defines a measure of how dependent the control logic for a particular actuator is upon a related control signal. The actuator effectiveness is a measure of effectiveness of a related control logic that controls the particular actuators relative to a specific performance index. The importance of related performance metrics in real-time defines a necessity of the related performance metric at a specific instant in time. The signal criticality defines a sum of sensitivities of control methods to an input signal multiplied by a sum of effectivnesses of control methods for a vehicle performance metric, multiplied by the importance of related performance metrics in real-time.

In another aspect of the present disclosure the method further includes defining a vehicle performance metric for each actuator configuration for the vehicle such that the vehicle performance metric includes one of: a no effect contribution towards a VMC objective; a contribution of limited effectiveness towards the VMC objective; and a contribution of high effectiveness towards the VMC objective. The high effectiveness is greater than the limited effectiveness, and the limited effectiveness is greater than the no effect contribution towards the VMC objective. Each actuator configuration has a specific and distinct contribution to each performance metric, and each actuator configuration defines a distinct subset of actuators equipped to the vehicle and contributes in a distinct manner to VMC.

In another aspect of the present disclosure the method further includes developing a VMC strategy that relates to current VMC objectives and the effectivenesses of control methods relative to performance metrics and associated VMC objectives. The VMC strategy is based upon the real-time vehicle dynamic state, signal criticality, and signal reliability, and ranking, with the VMC strategy, actuator control methods in relation to the current VMC objectives.

In another aspect of the present disclosure the method further includes actively, continuously, and automatically determining when a reliability of one or more input signals is equal to or below a predetermined reliability threshold for one or more input signals with a criticality equal to or above a predetermined threshold criticality value. Upon determining that the reliability of the one or more input signals is equal to or below the predetermined reliability threshold and that the criticality of the one or more input signals is equal to or above the predetermined threshold criticality value, actively, continuously, and automatically adapting by utilizing one or more alternate control methods having a reliability equal to or above the predetermined threshold for the criticality above the predetermined threshold criticality value. Upon determining that the reliability of the one or more input signals is equal to or above the predetermined reliability threshold while the criticality is equal to or above the predetermined threshold, utilizing a highest ranked control method applicable to the current VMC objectives.

In another aspect of the present disclosure the method further includes determining that the reliability of the one or more input signals is equal to or below the predetermined reliability threshold and automatically transitions actuator control to one or more alternate actuator control methods that have decreased sensitivity to the one or more input signals that have been identified as having reliability below the predetermined reliability threshold relative to the highest-ranked control method for applicable to the current VMC objectives.

In another aspect of the present disclosure the automatic transition between highest-ranked control method and one or more alternate actuator control methods is one or more of: automatic and instantaneous or automatic and gradual.

In another aspect of the present disclosure the method further includes actively, continuously, and automatically executing a fusion strategy for degradation mitigation that utilizes weighted averages of actuator control methods to define the VMC output command to the plurality of actuators. The VMC output command is calculated as:

$$\text{Weight Index of a Control Method} = \left[\sum \begin{array}{c}\text{Sensitivity of}\\ \text{control method}\\ \text{to input signal}\end{array} \times \sum \begin{array}{c}\text{Reliability of}\\ \text{Input Signal}\end{array}\right] \times \\ \left[\sum \begin{array}{c}\text{Effectiveness of}\\ \text{control method}\\ \text{for performance}\\ \text{metric}\end{array} \times \sum \begin{array}{c}\text{Importance of}\\ \text{a performance}\\ \text{metric in real-time}\end{array}\right] \qquad \text{I}$$

such that:
II.

$$\text{Final Actuator Control Command} = \\ \frac{\sum \begin{array}{c}\text{Weight Index of a}\\ \text{Control Method}\end{array} \times \sum \begin{array}{c}\text{Output of}\\ \text{Control Method}\end{array}}{\sum \begin{array}{c}\text{Weight Index of a}\\ \text{Control Method}\end{array}}$$

where the weight index for an actuator control method is calculated by multiplying the sensitivity of the control method by the reliability of the input signal and by the effectiveness of the actuator control method for a given actuator control algorithm, and multiplied further by the importance of a performance metric in real-time.

In another aspect of the present disclosure a method for vehicle motion control performance enhancement utilizing real-time data reliability and criticality assessments includes: collecting, with a plurality of sensors disposed on a vehicle, real-time information about a dynamic state of the vehicle, actively and continuously adjusting a dynamic state of the vehicle with a plurality of actuators disposed on the vehicle, and executing programmatic control logic including a vehicle motion control performance enhancement application (VMC application) stored in memory of a controller. The controller has a processor, a memory, and one or more input/output (I/O) ports. The I/O ports communicate with the plurality of sensors and the plurality of actuators. The VMC application including control logic including: obtaining, from the plurality of sensors and from the plurality of actuators, the real-time information about the dynamic state of the vehicle, including measuring in real-time, with the plurality of sensors and the plurality of actuators, a position, a movement, and an acceleration of the vehicle in three or more degrees of freedom. Each of the real-time dynamic state estimations defines a distinct aspect of the dynamic state of the vehicle. The VMC application further includes control logic for estimating a real-time vehicle dynamic state from the vehicle dynamic state information, and for determining a signal criticality and a signal reliability for vehicle dynamic state information. The signal criticality is based on signal sensitivity, actuator effectiveness of relevant actuators of the plurality of actuators, and importance of related performance metrics in real-time. The signal sensitivity defines a measure of how dependent the control logic for a particular actuator is upon a related control signal. The actuator effectiveness is a measure of effectiveness of a related control logic that controls the particular actuators relative to a specific performance index, and wherein importance of related performance metrics in real-time defines a necessity of the performance metric at a specific instant in time. The signal criticality defines a sum of sensitivities of control methods to an input signal multiplied by a sum of effectivnesses of control methods for a vehicle performance metric, multiplied by the importance of performance metrics in real-time. The VMC application further includes control logic for defining a vehicle performance metric for each actuator configuration for the vehicle such that the vehicle performance metric includes one of: a no effect contribution towards a VMC objective; a contribution of limited effectiveness towards the VMC objective; and a contribution of high effectiveness towards the VMC objective. The high effectiveness is greater than the limited effectiveness, and the limited effectiveness is greater than the no effect contribution towards the VMC objective. Each actuator configuration has a specific and distinct contribution to each performance metric, and each actuator configuration defines a distinct subset of actuators equipped to the vehicle and contributes in a distinct manner to VMC. The VMC application further includes control logic for developing a VMC strategy that relates to current VMC objectives and the effectivenesses of control methods relative to performance metrics and associated VMC objectives. The VMC strategy is based upon the real-time vehicle dynamic state, signal criticality, and signal reliability. The VMC application further includes control logic for ranking, with the VMC strategy, actuator control methods in relation to the current VMC objectives, for executing the VMC strategy based on the real-time vehicle dynamic state, the signal criticality and the signal reliability, and for actively, continuously, and automatically determining when a reliability of one or more input signals is equal to or below a predetermined reliability threshold for one or more input signals with a criticality equal to or above a predetermined threshold criticality value. Upon determining that the reliability of the one or more input signals is equal to or below the predetermined reliability threshold and that the criticality of the one or more input signals is equal to or above the predetermined threshold criticality value, actively, continuously, and automatically adapting by utilizing one or more alternate control methods having a reliability equal to or above the predetermined threshold for the criticality above the predetermined threshold criticality value. Upon determining that the reliability of the one or more input signals is equal to or above the predetermined reliability threshold while the criticality is equal to or above the predetermined threshold, utilizing a highest-ranked control method applicable to the current VMC objectives. The VMC application further includes control logic for determining that the reliability of the one or more input signals is equal to or below the predetermined reliability threshold and automatically transitions actuator control to one or more alternate actuator control methods that have decreased sensitivity to the one or more input signals that have been identified as having reliability below the predetermined reliability threshold relative to the highest-ranked control method for applicable to the current VMC objectives. The automatic transition between highest-ranked control method and one or more alternate actuator control methods is one or more of: automatic and instantaneous or automatic and gradual. The VMC application further includes control logic for detecting and mitigating signal degradation by selectively enacting one or more alternate VMC strategies; and for generating a VMC output command to the plurality of actuators based on the VMC strategy. The VMC strategy actively, continuously, and automatically adapts to seamlessly overcome signal degradation by actively, continuously, and automatically executing a fusion strategy for degradation mitigation that utilizes weighted averages of actuator control methods to define the VMC output command to the plurality of actuators. The VMC output command is calculated as:

Weight Index of a Control Method =
$$\left[\sum \begin{array}{c} \text{Sensitivity of} \\ \text{control method} \\ \text{to input signal} \end{array} \times \sum \begin{array}{c} \text{Reliability of} \\ \text{Input Signal} \end{array}\right] \times$$
$$\left[\sum \begin{array}{c} \text{Effectiveness of} \\ \text{control method} \\ \text{for performance} \\ \text{metric} \end{array} \times \sum \begin{array}{c} \text{Importance of} \\ \text{a performance} \\ \text{metric in real-time} \end{array}\right]$$

such that:
II.

Final Actuator Control Command =
$$\frac{\sum \begin{array}{c} \text{Weight Index of a} \\ \text{Control Method} \end{array} \times \sum \begin{array}{c} \text{Output of} \\ \text{Control Method} \end{array}}{\sum \begin{array}{c} \text{Weight Index of a} \\ \text{Control Method} \end{array}}$$

where the weight index for an actuator control method is calculated by multiplying the sensitivity of the control method by the reliability of the input signal and by the effectiveness of the actuator control method for a given actuator control algorithm, and multiplied further by the importance of a performance metric in real-time.

In another aspect of the present disclosure the plurality of sensors includes one or more of: inertial measurement units (IMUs), suspension control units, semi active damping suspension (SADS), global positioning system (GPS) sensors, wheel speed sensors, throttle position sensors, accelerator pedal position sensors, brake pedal position sensors, steering position sensors, tire pressure monitoring sensors, aerodynamic element position sensors. The plurality of actuators includes: in-plane actuators comprising: all-wheel drive (AWD) actuators, electronic all-wheel drive (eAWD) actuators, limited slip differentials (LSDs), electronically-controlled LSDs (eLSD), active steering or electronic power steering (EPS) at either or both of front and rear axles of the vehicle. The plurality of actuators further includes out-of-plane actuators comprising: active aerodynamic actuators for one or more active aerodynamic elements including: spoilers, fans, suction devices, actively-managed Venturi tunnels, and splitters; active suspension actuators including magnetorheological dampers, and electrically, hydraulically, or pneumatically adjusted dampers or springs.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
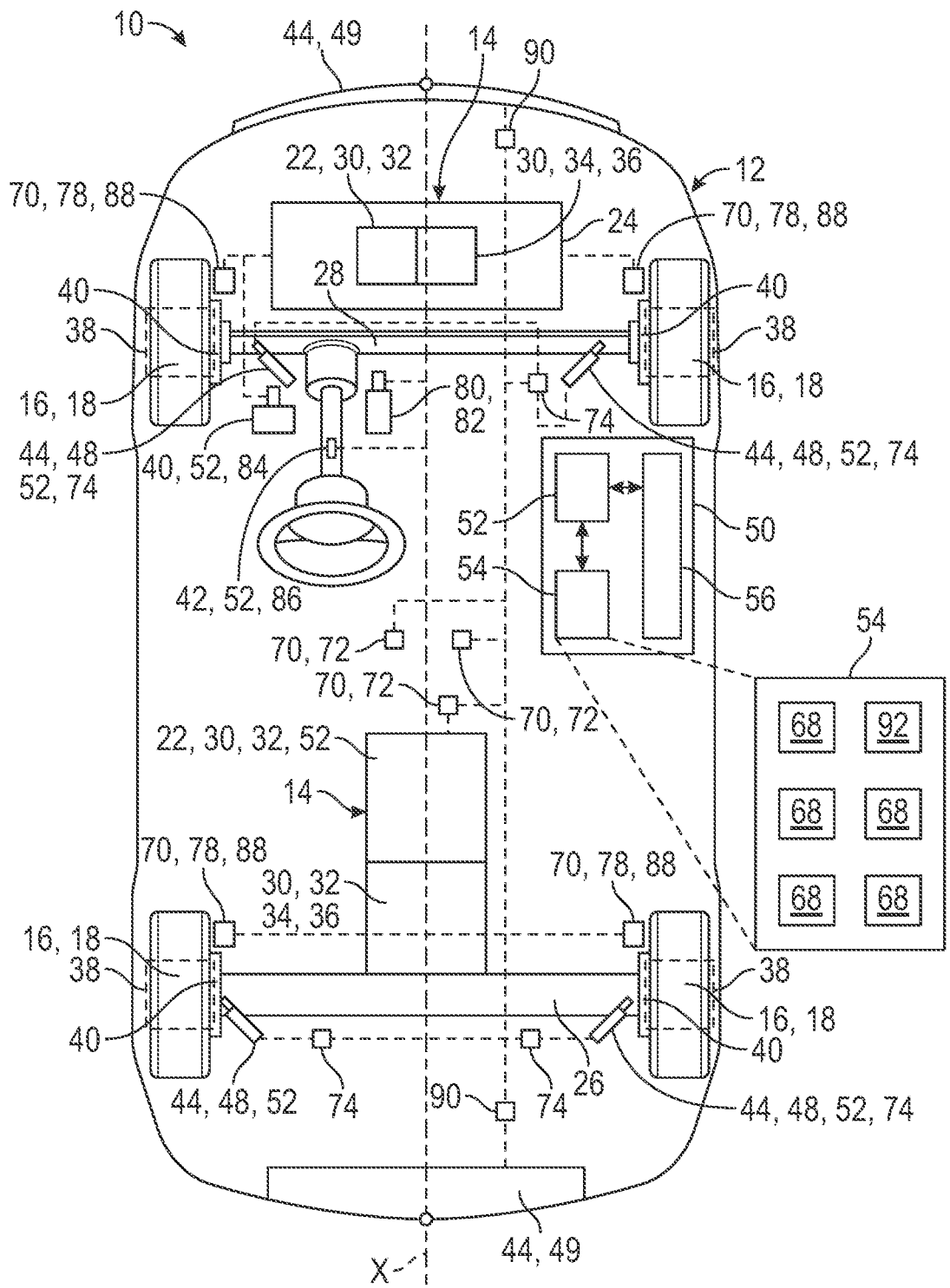
FIG. 1 is a schematic view of a system for vehicle motion control (VMC) performance enhancement using real-time data reliability and criticality assessments according to an aspect of the present disclosure.

Referring to FIG. 1, a system 10 for vehicle 12 motion control (VMC) performance enhancement utilizing real-time data reliability and criticality assessments is shown in schematic form. The system 10 operates on the vehicle 12. While the vehicle 12 shown is a car, it should be appreciated that the vehicle 12 may be a van, bus, tractor-trailer, semi, SUV, truck, bicycle, e-bike, tricycle, motorcycle, airplane, helicopter, amphibious vehicle, or any other such vehicle without departing from the scope or intent or the present disclosure. In the example shown in FIG. 1, the vehicle 12 is equipped with a powertrain 14 which is capable of transmitting motive force to wheels 16 of the vehicle, and to tires 18 affixed to the wheels 16. The powertrain 14 may include a variety of components, such as internal combustion engines (ICE) 20, and/or electric motors 22, as well as transmissions 24 capable of transmitting torque from the ICEs 20, and/or electric motors 22 to the wheels 16. In one example, the vehicle 12 may include an ICE 20 acting on a rear axle 26 of the vehicle 12 as well as one or more electric motors 22 acting on a front axle 28 of the vehicle 12. In additional examples, the vehicle 12 may use one or more ICEs 20, and/or one or more electric motors 22 arranged in additional configurations and providing torque to either front or rear axles 28, 26, or even to individual wheels 16 of the vehicle 12 without departing from the scope or intent of the present disclosure.

In several aspects, the powertrain 14 includes one or more in-plane actuators 30. The in-plane actuators 30 may include all-wheel drive (AWD) systems including electronically-controlled or electric AWD (eAWD) 32 systems, as well as limited slip differentials (LSDs) 34 including electronically-controlled or electric LSD (eLSD) 36 systems. In-plane actuators 30 can generate or modify force generation in X and/or Y directions at a tire 18 to road surface contact patch 38 within a predetermined capacity. An eAWD 32 system may transfer torque from a front to a rear of the vehicle 12 and/or from side-to-side of the vehicle 12. Likewise, an eLSD 36 may transfer torque from side-to-side of the vehicle 12. In some examples, the eAWD 32 and/or eLSD 36 may directly alter or manage torque delivery from the ICE 20 and/or electric motors 22 and/or the eAWD 32 and eLSD 36 may act on a braking system 40 to adjust a quantity of torque delivered to each of the tires 18 of the vehicle 12. Additional in-plane actuators 30 may include active steering or electronic power steering (EPS) systems 42 at either or both of the front and rear axles 28, 26. Active steering systems or EPS systems 42 may actively adjust an angle of the wheels 16 relative to the longitudinal axis X of the vehicle 12.

In further examples, the vehicle 12 may include a means of altering a normal force on each of the tires 18 of the vehicle 12 via one or more out-of-plane actuators 44. The out-of-plane actuators 44 of the vehicle 12 may include any of a wide variety of actuators 44 capable of managing vertical movement of the vehicle 12. In several aspects, the out-of-plane actuators 44 may include active aerodynamic actuators 46, active suspension actuators 48, or the like. Active aerodynamic actuators 46 may actively or passively alter an aerodynamic profile of the vehicle via one or more active aerodynamic elements 49 such as wings, spoilers, fans or other suction devices, actively-managed Venturi tunnels, splitters, or the like. Active suspension actuators 48 adjust suspension travel, spring rates, and damping characteristics In some examples, the active suspension actuators 48 may include magnetorheological dampers, pneumatic dampers or springs, or other such electrically, hydraulically, or pneumatically adjusted dampers or springs without departing from the scope or intent of the present disclosure.

The terms "forward", "rear", "inner", "inwardly", "outer", "outwardly", "above", and "below" are terms used relative to the orientation of the vehicle 12 as shown in the drawings of the present application. Thus, "forward" refers to a direction toward a front of a vehicle 12, "rearward" refers to a direction toward a rear of a vehicle 12. "Left" refers to a direction towards a left-hand side of the vehicle 12 relative to the front of the vehicle 12. Similarly, "right" refers to a direction towards a right-hand side of the vehicle 12 relative to the front of the vehicle 12. "Inner" and "inwardly" refers to a direction towards the interior of a vehicle 12, and "outer" and "outwardly" refers to a direction towards the exterior of a vehicle 12, "below" refers to a direction towards the bottom of the vehicle 12, and "above" refers to a direction towards a top of the vehicle 12. Further, the terms "top", "overtop", "bottom", "side" and "above" are terms used relative to the orientation of the actuators, and the vehicle 12 more broadly shown in the drawings of the present application. Thus, while the orientation of actuators 52, or vehicle 12 may change with respect to a given use, these terms are intended to still apply relative to the orientation of the components of the system 10 and vehicle 12 components shown in the drawings.

The system 10 further includes one or more controllers 50. The controllers 50 are non-generalized electronic control devices having a preprogrammed digital computer or processor 52, non-transitory computer readable medium or memory 54 used to store data such as control logic, software applications, instructions, computer code, data, lookup tables, etc., and input/output (I/O) ports 56. Computer readable medium or memory 54 includes any type of medium capable of being accessed by a computer, such as read only memory (ROM), random access memory (RAM), a hard disk drive, solid-state memory, a compact disc (CD), digital video disc (DVD), or any other type of memory 54. A non-transitory computer readable memory 54 excludes wired, wireless, optical, or other communication links that transport transitory electrical or other signals. A non-transitory computer readable memory 54 includes media where data can be permanently stored and media where data can be stored and later overwritten, such as a rewritable optical disc or an erasable memory device. Computer code includes any type of program code, including source code, object code, and executable code. The processor 52 is configured to execute the code or instructions. The vehicle 12 may have controllers 50 including a dedicated Wi-Fi controller, an engine control module, a transmission control module, a body control module, a suspension control module, a brake control module, an infotainment control module, or the like. The I/O ports 56 may be configured to communicate via wired communications, wirelessly via Wi-Fi protocols under IEEE 802.11x, cellular links, satellite links, or the like without departing from the scope or intent or the present disclosure.

The on-board controller 50 further includes one or more applications 68. An application 68 is a software program configured to perform a specific function or set of functions. The application 68 may include one or more computer programs, software components, sets of instructions, procedures, functions, objects, classes, instances, related data, or a portion thereof adapted for implementation in a suitable computer readable program code. The applications 68 may be stored within the memory 54 or in additional or separate memory 54. In several aspects, applications 68 may manage powertrain system functions, suspension system functions, brake system functions, aerodynamic system functions, and/or body control system functions in an exemplary vehicle 12.

Applications 68 managing powertrain system functions, suspension system functions, brake system functions, aerodynamic system functions, and body control system functions in the vehicle 12 receive static and/or dynamic vehicle state information or sensory data from a suite of sensors 70 disposed on the vehicle 12. The sensors 70 may include any of a wide variety of sensors 70 including inertial measurement units (IMUs) 72, suspension control units such as Semi Active Damping Suspension (SADS) 74, global positioning system (GPS) 76 sensors, wheel speed sensors 78, throttle position sensors 80, accelerator pedal position sensors 82, brake pedal position sensors 84, steering position sensors 86, tire pressure monitoring sensors 88, aerodynamic element position sensors 90, and the like. IMUs 72 measure movement, acceleration, and the like in several degrees of freedom. In a specific example, the IMUs 72 may measure position, movement, acceleration and the like in three or more degrees of freedom. Likewise the SADS 74 sensors may be IMUs 72 capable of measuring in three or more degrees of freedom. In some more specific examples, the SADS 74 may be suspension hub accelerometers, or the like. The sensory data may therefore include, but not be limited to: wheel 16 speed data, SADS 74 and IMU 72 data including attitude, acceleration, and the like.

In several aspects, the sensory data is obtained from the sensors 70 via the I/O ports 56 by a VMC performance enhancement application (VMC application 92). The VMC application 92 utilizes the sensory data about the vehicle 12 to determine what the positions of the in-plane actuators 30 and out-of-plane actuators 44 should be to achieve a certain vehicle 12 state, and to provide resilient, redundant, and accurate control of the vehicle's 12 motions.

The VMC application 92 obtains sensory data from the one or more sensors 70 and in-plane and out-of-plane actuators 30, 44 and transfers the sensory data as input signals to a series of VMC application 92 sub-routines that process the sensory data to perform vehicle 12 motion control functions, such as active downforce control, active steering, active suspension adjustments, dynamic roll and/or stability control, or the like. Because VMC functions depend on reliability of the input signals, when input signal reliability decreases as sensors 70 and in-plane and out-of-plane actuator 30, 44 performance degrades over time, VMC functions can likewise be negatively impacted.

Different control methods can achieve the same or similar VMC function results. For example, an active aerodynamic downforce control system may utilize multiple signals such as vehicle 12 acceleration in X and Y directions, steering velocity, and engine torque output as input signals. In classical control systems, when one such input signal, for example, acceleration in the X direction, becomes unreliable due to sensor 70 degradation or failure, a classical active downforce control system may fail to properly and accurately manage VMC downforce functionality. Similarly, a simplified classical control methodology may utilize fewer input signals overall to manage active downforce. In some examples, the simplified classical control methodology may utilize only acceleration in the Y direction and steering velocity. However, when the simplified classical control methodology is used, the VMC downforce functionality may not be situationally optimized to provide the best possible vehicle 12 performance, as insufficient input data is available.

In order to avoid the ineffective outcomes described hereinabove, the system 10 utilizes the VMC application 92 to combine and fuse different control logics and input signals for active control of various VMC functions to enhance the performance and robustness of vehicle 12 motion control.

Figure 2:
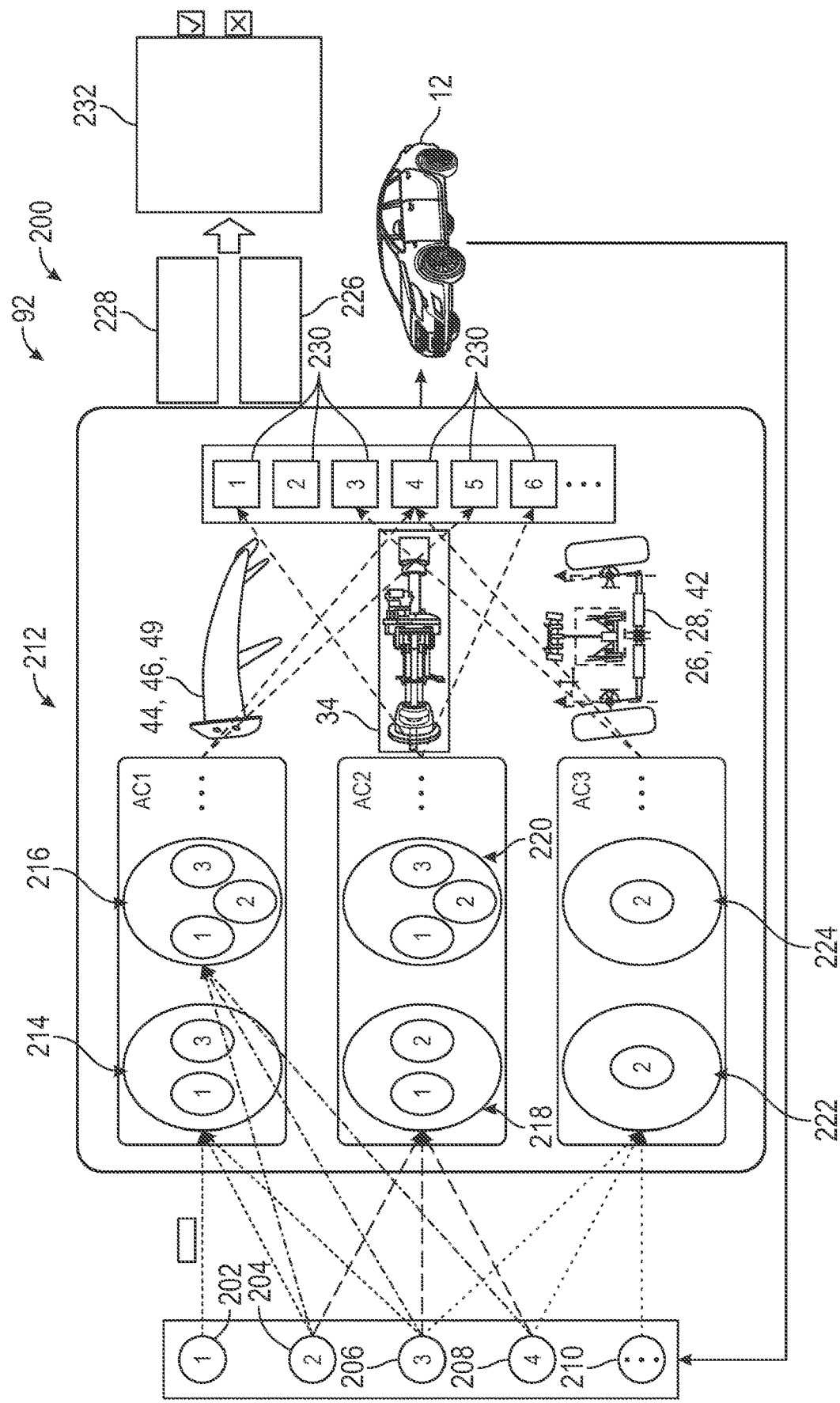
FIG. 2 is a flowchart depicting control logic steps of a VMC performance enhancement application (VMC application) of the system for VMC performance enhancement using real-time data reliability and criticality assessments of FIG. 1 according to an aspect of the present disclosure.

Turning now to FIG. 2 and with continuing reference to FIG. 1, the system 10, and more specifically, the VMC application 92 is shown in further detail in chart 200. The VMC application 92 obtains sensory data from the one or more sensors 70 and in-plane and out-of-plane actuators 30, 44. The system 10 generates a plurality of vehicle 12 and wheel 16 dynamic state measurements and estimations. Each dynamic state is represented in the chart 200 as a separate one of blocks 202, 204, 206, 208, and 210. The vehicle 12 and wheel 16 dynamic state measurements and estimations are utilized as inputs for actuator control algorithm 212 of the VMC application 92. The actuator control algorithm 212 may include one or more actuator control sub-algorithms or sub-systems AC1, AC2, AC3, etc. that each manage different types of control. In several examples, AC1 defines active aerodynamic control, such as active downforce control, while AC2 defines an eLSD 36 control, and AC3 defines active roll or active anti-roll control of the vehicle 12. While only AC1, AC2, and AC3 are specifically shown in the figures, it should be appreciated that any quantity of actuator control sub-algorithms or sub-systems may be used without departing from the scope or intent of the present disclosure. Each of AC1, AC2 and AC3 utilize one or more actuator control methods 214, 216, 218, 220, 222, 224 to manage VMC performance. Each of the actuator control methods 214, 216, 218, 220, 222, 224 utilizes data obtained by a subset of the sensors 70 and in-plane and out-of-plane actuators 30, 44 equipped to the vehicle 12 to determine a possible set of in-plane and out-of-plane actuator 30, 44 control commands.

More specifically, a first actuator control method 214 of AC1 uses predefined and/or actively adjustable control objectives to assist in defining in- and out-of-plane actuator 30, 44 control outputs. In several examples, first actuator control method 214 of AC1 includes control objective 1 and control objective 3, while second actuator control method 216 of AC1 utilizes control objectives 1, 2, and 3, where control objective 1 is a lateral stability control objective, control objective 2 is an agility and handling control objective, and control objective 3 is a wheel stability control objective. It will be appreciated that while only control objectives 1, 2, and 3 are shown and described herein, other control objectives may be parts of each of the control actuator sub-algorithms or sub-systems of the VMC performance enhancement system 10 of the vehicle 12 without departing from the scope or intent of the present disclosure. In some additional examples, the control objectives may include rollover prevention, wheel slip control such as traction and/or braking control, lateral stability, and handling and maneuverability, or the like.

After receiving the vehicle 12 and wheel 16 dynamic state measurements and estimations, the actuator control algorithm 212 assesses a reliability 226 and criticality 228 of the actuator control sub-algorithms or sub-systems AC1, AC2, AC3, etc. Criticality 228 of input signals is determined based on signal sensitivity, actuator effectiveness, and the importance of a performance metric 230 in real-time. The sensitivity of an actuator control with respect to each signal is defined as how dependent the control logic for the actuator is upon the related signal. For example, a body control logic that is formulated based on an understeer angle is sensitive to the understeer estimation. Whereas, when the control is designed based on yaw rate error, then the body control logic is sensitive to yaw rate and desired yaw rate signals from the sensors 70 and in-plane and out-of-plane actuators 30, 44 equipped to the vehicle 12. Actuator effectiveness is a measure of how effective the control logic for relevant actuators 30, 44 is for a specific performance index. In a non-limiting example, an anti-roll bar actuator is effective for controlling the vehicle's 12 roll motion. The importance of a performance metric 230 in real-time is determined by the necessity of the performance metric 230 in a specific time instant. Formulated another way, a criticality 228 of an input signal may be defined as a sum of the sensitivities of control methods to the input signal, multiplied by the sum of effectivenesses of the control methods for a performance metric 230, multiplied by the importance of a performance metric 230 in real-time. The criticality 228 of the input signal provides the VMC application 92 a real-time understanding of performance metrics 230 at the same time as looking at performance sensitivity of actuator control. Vehicle performance metrics 230 are defined for each actuator configuration for a given vehicle 12 and set of in-plane and out-of-plane actuators 30, 44 equipped to the vehicle 12. Each actuator configuration has a specific contribution to each performance metric 230. An example of a high-level assessment of contributions of each actuator configuration to performance metrics 230 is shown in the following chart:

| | | Actuator Configuration | | | | | |
|---|---|---|---|---|---|---|---|
| | | Electronic Stability Control | Active/Semi-Active Suspension Control | Active Roll Control | Torque Vectoring | Active Rear Steering | Active Downforce Control |
| Handling | Roll Gradient | − | + | + | / | / | / |
| | Maximum Lateral Accel. | − | + | + | + | / | + |
| | Cornering Compliance | − | / | + | + | / | + |
| | Steering Response | − | / | / | + | + | / |
| | Steering Feel | − | / | / | + | + | / |
| | Steering Linearity | − | / | / | + | + | / |
| | Parking Effort | − | − | − | / | + | − |
| | Turning Circle | − | + | + | + | + | / |
| | Track Performance | − | + | + | + | / | + |
| Agility | Routine Transient Handling | − | / | / | + | + | − |
| | Lateral Acceleration Gains | − | / | / | + | + | − |
| | Limit Transient Handling | − | / | / | + | + | − |
| Stability | Stability Margin | + | / | / | + | + | + |
| | Static Stability Factor | + | / | / | + | + | + |
| | Rollover Avoidance | + | + | + | + | / | / |
| | Highway Off-Ramp Stability and Performance | + | + | + | + | / | + |
| | High Speed Stability and Performance | + | + | + | + | / | + |
| | Evasive Maneuver Stability and Performance | + | + | + | + | + | + | where for each contribution, a "+" indicates a highly effective contribution, a "/" indicates a contribution of limited effectiveness, and a "−" indicates no effect for the actuator configuration on a given control objective.

The VMC application 92 subsequently develops a VMC strategy based on the control objectives, and the effectivenesss of the control methods relative to performance metrics 230 and the associated objectives. It will be appreciated that certain in-plane and out-of-plane actuators 30, 44 are highly effective at altering vehicle 12 motion in relation to a given set of circumstances or control objectives, as shown in the chart above. Accordingly, the VMC application 92 determines which of various available control actuations will be most effective at addressing the control objectives presently relevant to VMC for the vehicle 12. That is, the VMC application 92 ranks each actuator control AC1, AC2, AC3, etc. in relation to the control objective currently being addressed by the VMC application 92. In the example shown in FIG. 2, aerodynamic control or active downforce of the vehicle 12 may be implicated in handling and maneuverability and/or lateral stability of the vehicle 12. Torque vectoring (TV) and/or differential braking may be used to partially or fully manage to handling and maneuverability, lateral stability, rollover prevention and wheel slip control objectives. Similarly, active front steering and/or active rear steering may be used to partially or fully manage to handling and maneuverability, lateral stability and rollover prevention objectives, while active anti-roll bars may be used to partially manage to handling and maneuverability, and rollover prevention objectives. However, departures from the above contributions to the various control objectives should be understood to be within the scope and intent of the present disclosure.

In several aspects, the input signal criticality 228 and input signal reliability are used to determine if reliability 226 is low for a given input signal with a high criticality 228 score. It should be appreciated that a high criticality 228 score is greater than a low criticality 228 score, and that a high criticality 228 score may be a criticality 228 score equal to or above a predetermined threshold criticality 228 score value. Likewise, it should be appreciated that a low reliability 226 score is smaller than a high reliability 226 score, and that a low reliability 226 score may be a reliability 226 score equal to or below a predetermined threshold reliability 226 score value. More specifically, the system 10 and VMC application 92 detect whether performance degradation is occurring and actively, continuously, and automatically adapts to address such degradation. The detection of performance degradation of a given in-plane or out-of-plane actuator 30, 44 and/or sensor 70 is important because the quality of signal data produced thereby may directly impact the accuracy of control outputs to the various in-plane and/or out-of-plane actuators 30, 44 to manage VMC in a given dynamic situation. Accordingly, when a signal from one or more of the sensors 70 and in-plane and/or out-of-plane actuators 30, 44 is flagged 232 as having a low reliability 226 despite having high criticality 228, the VMC application 92 automatically shifts to one or more of the other control methods 212, 214, etc. that utilizes information from other sensors 70 or in-plane and/or out-of-plane actuators 30, 44.

More specifically, the VMC application 92 utilizes degradation mitigation logic to select control methods. In a non-limiting example, control method selection logic may determine if the reliability 226 of an input signal is lower than a threshold value. Upon making such a determination, the actuator controls that are using a control method consuming the low reliability 226 signal are switched to an alternate control method that is not sensitive, or which has decreased sensitivity to the signals determined to be of low reliability 226. The control method's sensitivity level to the low reliability 226 signal is also important, because when the method's sensitivity is very low, then the low reliability 226 signal has a decreased impact on the control method's reliability 226 and performance. The VMC application's 92 degradation mitigation logic attempts to transition to an alternate control method before any detrimental VMC control actions may occur. Reliability 226 may fluctuate, but the VMC application 92 can gradually or instantaneously transition between models as needed. In further aspects, the reliability 226 of an actuator control subsystem decreases when sensitivity to a low reliability 226 signal is high. Accordingly, a failure mode of a given actuator control subsystem may include operating ranges where sensitivity to low reliability 226 signals is high.

The VMC application 92 executes a fusion strategy for degradation mitigation that utilizes weighted averages of the outputs of actuator control methods to define a final output command to the actuators of the vehicle 12. The fusion strategy is defined based on a variety of criteria including: reliability 226 and sensitivity of input signals as well as a given actuator control method's effectiveness for performance metrics 230 and the importance of each performance metric 230 in real-time. A final actuator command may be calculated as:

I $$\text{Weight Index of a Control Method} = \left[\sum \begin{smallmatrix}\text{Sensitivity of}\\ \text{control method}\\ \text{to input signal}\end{smallmatrix} \times \sum \begin{smallmatrix}\text{Reliability of}\\ \text{Input Signal}\end{smallmatrix}\right] \times$$

$$\left[\sum \begin{smallmatrix}\text{Effectiveness of}\\ \text{control method}\\ \text{for performance}\\ \text{metric}\end{smallmatrix} \times \sum \begin{smallmatrix}\text{Importance of}\\ \text{a performance}\\ \text{metric in real-time}\end{smallmatrix}\right]$$

such that:

II.

$$\text{Final Actuator Control Command} = \frac{\sum \begin{smallmatrix}\text{Weight Index of a}\\ \text{Control Method}\end{smallmatrix} \times \sum \begin{smallmatrix}\text{Output of}\\ \text{Control Method}\end{smallmatrix}}{\sum \begin{smallmatrix}\text{Weight Index of a}\\ \text{Control Method}\end{smallmatrix}}$$

In broad terms, the weight index for an actuator control method is calculated by multiplying the relevant sensitivity by reliability 226 and effectiveness of a given actuator control algorithm, multiplied further by the importance of a performance metric 230. In some examples, for the purposes of enhanced robustness, some thresholds are defined for minimum reliability 226 and effectiveness indices to decide if control methods should be included in the fusion algorithm.

Figure 3:
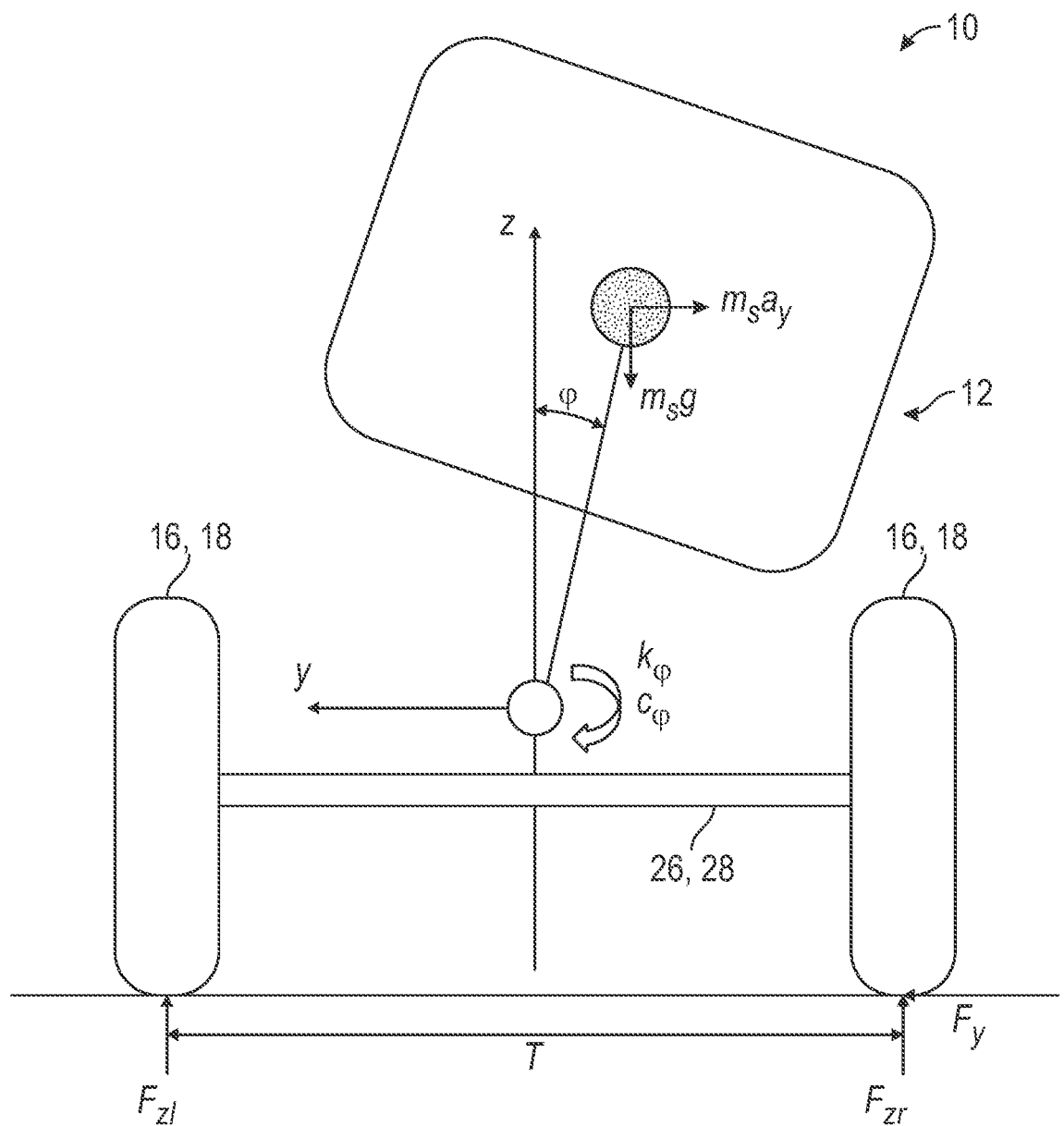
FIG. 3 is a schematic depiction of a portion of a vehicle utilizing the VMC application of FIG. 1 for rollover prevention according to an aspect of the present disclosure.

Turning now to FIG. 3 and with continuing reference to FIGS. 1 and 2, an example of the VMC application's 92 use in a rollover prevention objective is shown in further detail. Vehicle rollover is an important safety concern for a variety of vehicles 12. Different methodologies for improving rollover stability have been proposed previously, and the development of active rollover prevention systems is ongoing. Development of rollover prevention systems typically involves at least two steps, detection of a rollover risk, and mitigation and control. Accordingly, accurate knowledge of the rollover risk of a vehicle 12 is indispensable to developing a practical rollover prevention system. For proper detection of rollover, several different rollover indices (RIs) defining different formulations of rollover estimates are proposed. The RIs include:

$RI_1$=LTR: Lateral load transfer ratio;
$RI_2$: based on vehicle 12 roll angle and lateral acceleration;
$RI_3$: based on vehicle 12 roll angle and roll rate;
$RI_4$: based on vehicle 12 suspension height;
$RI_5$: based on tire 18 deflection.

With respect to $RI_1$, specifically, LTR is the most reliable rollover index, which may be defined as:

III.

$$LTR = \frac{F_{zr} - F_{zl}}{F_{zr} + F_{zl}};$$

where $F_{zr}$ and $F_{zl}$ are the normal force for the right and left side of the vehicle 12. A primary challenge for using LTR is the measurement or estimation of normal forces.

$RI_2$, based on the vehicle 12 roll angle and lateral acceleration may be defined as:

IV.

$$RI_2 = \frac{2m_s}{mT}\left(h_r + h_s\cos\varphi\right)\frac{a_y}{g} + h_s\sin\varphi\right)$$

where $m_s$ is the sprung mass of the vehicle 12, m is the total mass of the vehicle 12, $h_s$ is the distance of the center of gravity of the vehicle 12 to the roll center of the vehicle 12, $h_R$ is the roll center height of the vehicle 12, $\varphi$ is the vehicle 12 roll angle, $a_y$ is the lateral acceleration of the vehicle 12, T is the vehicle's 12 track, and g is the force of gravity.

RI₃, based on the vehicle 12 roll angle and roll rate may be defined as:

V.

$$RI_3 = -\frac{2(c_\varphi \dot{\varphi} + k_\varphi \varphi)}{mgT}$$

where φ is the vehicle 12 roll angle, φ̇ is the vehicle 12 roll rate, $k_\varphi$ is the roll effective torsional stiffness of the vehicle 12, $c_\varphi$ is the roll effective torsional damping of the vehicle 12, m is the total mass of the vehicle 12, T is the vehicle's 12 track, and g is the force of gravity.

RI₄, based on the vehicle 12 suspension height is concerned with differences between right and left side suspension heights, as such differences define indicators of vehicle 12 rollover risk.

RI₅, based on the vehicle 12 tire 18 deflection is concerned with differences between right and left side tire 18 deflection, as such deflection on a side of the vehicle 12 with more tire 18 load than the other side of the vehicle 12 is an indicator of rollover risk.

The VMC application 92 further determines an effectiveness of the various rollover prevention methods RI₁, RI₂, RI₃, RI₄, and RI₅. The effectiveness of rollover prevention methods using a specific rollover index is determined by a level of confidence of that index. That is the indices that show rollover instability with higher confidence levels provide more effective control methods for rollover prevention in a given contextual situation. To fuse three different stability indices, the criticality 228 of each index is considered. The criticality 228 or priority of each index is defined as the extent that the instability index is directly related to the instability for the body dynamics of the vehicle 12. Depending on the signals utilized, as well as the nature of each selected method, rollover indices may have different levels of reliability 226. The reliability 226 or confidence level of each index depends on the utilized signals and the relevant algorithms. The reliability 226 of rollover indices are considered in the fusion process as well. That is, because the reliability 226 of different rollover indices may vary in real-time, knowing the vehicle 12 type, tire 18 conditions, upcoming road geometry, and the like, provides for the VMC application 92 to apply different weights to the indices.

In a first non-limiting example, the system 10 utilizing the VMC application 92 utilizes three different control methods for active aerodynamic downforce control. Each of the control methods has dependency upon different input signals and/or different combinations of input signals. Therefore, the reliability 226 of each of the three different control methods is dependent upon the reliability 226 of the respective input signals. The first exemplary method is fundamentally based upon longitudinal velocity (V-based), while the second exemplary method is based upon steering angle and longitudinal velocity (Str-V-based), and the third exemplary method is based on Torque (or Fx), steering angle, and longitudinal velocity (Trq-Str-V-Based). In general, in an idealized situation where all signals are of equal reliability 226, method 3 is considered the preferred solution for managing VMC via the active aerodynamic downforce control, as the third method has the highest performance. However, because the real-world reliability 226 of Fx estimations is often low, the first and/or second methods are used. Method 2 is good, in the absence of method 3, but if the steering and steering rate signals are insufficiently reliable, method 1 should be used. Method 1 is simple, but has the lowest performance compared to methods 2 and 3. The sensitivity of each of exemplary control methods 1, 2, and 3 to input signals is shown in the chart below.

| Control Method | Ay | Brake | Vx | Str | Str rate | Fx |
|---|---|---|---|---|---|---|
| V-based | M | H | H | N | N | N |
| Str-V-Based | L | M | H | H | M | N |
| Trq-Str-V-based | L | M | H | H | M | H | where H=high sensitivity; M=medium sensitivity; and N=not sensitive.

In a second non-limiting example, three distinct control methods are considered for vehicle 12 body control using eAWD 32 for distributing torque to front and rear axles 28, 26. Each control method has dependency upon different input signals and/or different combinations of input signals, and the reliability 226 of each of the control methods is therefore dependent upon the reliability 226 of the respective input signals. The first method for eAWD body control utilizes the vehicle's 12 lateral velocity estimation to calculate sideslip and ensure vehicle 12 body stability. The second method utilizes road surface friction estimations to calculate a desired yaw rate and yaw rate error for controlling the vehicle's 12 body motion. The third method utilizes understeer angle estimations, which are independent of longitudinal velocity (Vy) or road surface friction, for controlling the vehicle's 12 body motions.

In an idealized situation where all signals are reliable, the first method is the best solution because it has the highest performance when applied. However, because the reliability 226 of lateral velocity estimations may be low, the other two methods may be utilized. The second method is good in the absence of method 1, but when the friction estimation is insufficiently reliable, the third method is necessary. The third method is independent of lateral velocity and road friction, but has the lowest performance compared to the other two methods.

In a slightly more specific example of the second non-limiting example, the reliability 226 of Vy estimations is low, but the desired yaw rate and understeer angle measurements or estimations are reliable. Therefore, because the priority of the second control method is greater than that of the third control method, the second control method is used while the relevant conditions exist. Friction estimation reliability 226 and accordingly the reliability 226 of desired yaw rates may decrease in certain situations, but the understeer angle measurement may remain reliable. Using a transition strategy, the VMC application 92 body control may be managed through fused strategies based on both the second and third control methods, and subsequently switching to control using the third method. In further situations, both friction estimations and lateral velocity estimations are unreliable, an therefore, the only suitable control method to use is the third control method.

A system and method for vehicle 12 motion control performance enhancement using real-time data reliability 226 and criticality 228 assessments of the present disclosure offers several advantages. These include the provision of a robust, redundant, and reliable means of achieving an optimum vehicle 12 motion control outcome, while providing a health monitoring and degradation mitigation for multi-actuation multi-objective vehicle 12 motion control, and while providing a means of determining input signal criticality 228 and monitoring and generating performance metrics 230 for VMC sub-systems in real-time without increasing manufacturing complexity, while utilizing existing hardware, and improving customer experience.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A system for vehicle motion control performance enhancement utilizing real-time data reliability and criticality assessments, the system comprising:
  a vehicle;
  a plurality of sensors disposed on the vehicle and collecting real-time information about a dynamic state of the vehicle;
  a plurality of actuators disposed on the vehicle, and actively and continuously adjusting the dynamic state of the vehicle;
  a controller having a processor, a memory, and one or more input/output (I/O) ports, the I/O ports communicating with the plurality of sensors and the plurality of actuators, the processor executing programmatic control logic stored in the memory, the programmatic control logic including a vehicle motion control performance enhancement (VMC) application, the VMC application comprising:
    a first control logic for obtaining, from the plurality of sensors and from the plurality of actuators, the real-time information about the dynamic state of the vehicle;
    a second control logic for estimating a real-time vehicle dynamic state from the vehicle dynamic state information;
    a third control logic for determining a signal criticality and a signal reliability for vehicle dynamic state information;
    a fourth control logic for executing a VMC strategy based on the real-time vehicle dynamic state, the signal criticality and the signal reliability;
    a fifth control logic for detecting and mitigating signal degradation by selectively enacting one or more alternate VMC strategies; and
    a sixth control logic for generating a VMC output command to the plurality of actuators based on the VMC strategy, wherein the VMC strategy actively, continuously, and automatically adapts to seamlessly overcome signal degradation, including:
      control logic for actively, continuously, and automatically executing a fusion strategy for degradation mitigation that utilizes weighted averages of actuator control methods to define the VMC output command to the plurality of actuators, wherein the VMC output command is calculated as:

I.

$$\text{Weight Index of a Control Method} = \left[ \sum \begin{matrix} \text{Sensitivity of} \\ \text{control method} \\ \text{to input signal} \end{matrix} \times \sum \begin{matrix} \text{Reliability of} \\ \text{Input Signal} \end{matrix} \right] \times$$

$$\left[ \sum \begin{matrix} \text{Effectiveness of} \\ \text{control method} \\ \text{for performance} \\ \text{metric} \end{matrix} \times \sum \begin{matrix} \text{Importance of} \\ \text{a performance} \\ \text{metric in real-time} \end{matrix} \right]$$

such that:

II.

$$\text{Final Actuator Control Command} = \frac{\sum \begin{matrix} \text{Weight Index of a} \\ \text{Control Method} \end{matrix} \times \sum \begin{matrix} \text{Output of} \\ \text{Control Method} \end{matrix}}{\sum \begin{matrix} \text{Weight Index of a} \\ \text{Control Method} \end{matrix}}$$

where the weight index for an actuator control method is calculated by multiplying a sensitivity of the control method by the reliability of the input signal and by an effectiveness of the actuator control method for a given actuator control algorithm, and multiplied further by importance of a performance metric in real-time.

2. The system of claim 1, wherein the second control logic further comprises:
  measuring in real-time, with the plurality of sensors and the plurality of actuators, a position, a movement, and an acceleration of the vehicle in three or more degrees of freedom, wherein each real-time dynamic state estimation defines a distinct aspect of the dynamic state of the vehicle.

3. The system of claim 1, wherein the third control logic further comprises:
  determining the signal criticality based on signal sensitivity, actuator effectiveness of relevant actuators of the plurality of actuators, and importance of related performance metrics in real-time, wherein the signal sensitivity defines a measure of how dependent the control logic for a particular actuator is upon a related control signal, wherein the actuator effectiveness is a measure of effectiveness of a related control logic that controls the particular actuators relative to a specific performance index, and wherein importance of related performance metrics in real-time defines a necessity of the related performance metric at a specific instant in time; and
  wherein the signal criticality defines a sum of sensitivities of control methods to an input signal multiplied by a sum of effectivnesses of control methods for a vehicle performance metric, multiplied by the importance of performance metrics in real-time.

4. The system of claim 3, wherein a vehicle performance metric is defined for each actuator configuration for the vehicle such that the vehicle performance metric comprises one of:
  a no effect contribution towards a VMC objective;
  a contribution of limited effectiveness towards the VMC objective; and
  a contribution of high effectiveness towards the VMC objective, wherein the high effectiveness is greater than the limited effectiveness, and the limited effectiveness is greater than the no effect contribution towards the VMC objective; and
  wherein each actuator configuration has a specific and distinct contribution to each performance metric, and each actuator configuration defines a distinct subset of actuators equipped to the vehicle and contributes in a distinct manner to VMC.

5. The system of claim 4, wherein based upon the real-time vehicle dynamic state, signal criticality, and signal reliability, the VMC application executes the fourth control logic and develops a VMC strategy that relates to current VMC objectives and the effectivenesses of control methods relative to performance metrics and associated VMC objectives; and
wherein the VMC strategy ranks actuator control methods in relation to the current VMC objectives.

6. The system of claim 1, wherein the second control logic further comprises:
measuring in real-time, with the plurality of sensors and the plurality of actuators, a position, a movement, and an acceleration of the vehicle in three or more degrees of freedom, wherein each real-time dynamic state estimation defines a distinct aspect of the dynamic state of the vehicle.

7. The system of claim 6, wherein the fifth control logic further comprises:
control logic that determines that the reliability of the one or more input signals is equal to or below the predetermined reliability threshold and automatically transitions actuator control to one or more alternate actuator control methods that have decreased sensitivity to the one or more input signals that have been identified as having reliability below the predetermined reliability threshold relative to the highest-ranked control method for applicable to the current VMC objectives.

8. The system of claim 7, wherein the automatic transition between highest-ranked control method and one or more alternate actuator control methods occurs automatically and instantaneously or automatically and gradually.

9. A method for vehicle motion control performance enhancement utilizing real-time data reliability and criticality assessments, the method comprising:
collecting, with a plurality of sensors disposed on a vehicle, real-time information about a dynamic state of the vehicle;
actively and continuously adjusting a dynamic state of the vehicle with a plurality of actuators disposed on the vehicle;
executing programmatic control logic including a vehicle motion control performance enhancement application (VMC application) stored in memory of a controller of the vehicle, the controller having a processor, a memory, and one or more input/output (I/O) ports, the I/O ports communicating with the plurality of sensors and the plurality of actuators, the VMC application including control logic comprising:
obtaining, from the plurality of sensors and from the plurality of actuators, the real-time information about the dynamic state of the vehicle;
estimating a real-time vehicle dynamic state from the vehicle dynamic state information;
determining a signal criticality and a signal reliability for vehicle dynamic state information;
executing a VMC strategy based on the real-time vehicle dynamic state, the signal criticality and the signal reliability;
detecting and mitigating signal degradation by selectively enacting one or more alternate VMC strategies; and
generating a VMC output command to the plurality of actuators based on the VMC strategy, wherein the VMC strategy actively, continuously, and automatically adapts to seamlessly overcome signal degradation, including:
actively, continuously, and automatically executing a fusion strategy for degradation mitigation that utilizes weighted averages of actuator control methods to define the VMC output command to the plurality of actuators, wherein the VMC output command is calculated as:

I.

Weight Index of a Control $$\text{Method} = \left[\sum \begin{array}{c}\text{Sensitivity of} \\ \text{control method} \\ \text{to input signal}\end{array} \times \sum \begin{array}{c}\text{Reliability of} \\ \text{Input Signal}\end{array}\right] \times$$

$$\left[\sum \begin{array}{c}\text{Effectiveness of} \\ \text{control method} \\ \text{for performance} \\ \text{metric}\end{array} \times \sum \begin{array}{c}\text{Importance of} \\ \text{a performance} \\ \text{metric in real-time}\end{array}\right]$$

such that:

Final Actuator Control Command =

$$\frac{\sum \begin{array}{c}\text{Weight Index of a} \\ \text{Control Method}\end{array} \times \sum \begin{array}{c}\text{Output of} \\ \text{Control Method}\end{array}}{\sum \begin{array}{c}\text{Weight Index of a} \\ \text{Control Method}\end{array}}$$

II.
where the weight index for an actuator control method is calculated by multiplying a sensitivity of the control method by the reliability of the input signal and by an effectiveness of the actuator control method for a given actuator control algorithm, and multiplied further by importance of a performance metric in real-time.

10. The method of claim 9, further comprising:
measuring in real-time, with the plurality of sensors and the plurality of actuators, a position, a movement, and an acceleration of the vehicle in three or more degrees of freedom, wherein each of the real-time dynamic state estimations defines a distinct aspect of the dynamic state of the vehicle.

11. The method of claim 9, further comprising:
determining the signal criticality based on signal sensitivity, actuator effectiveness of relevant actuators of the plurality of actuators, and importance of related performance metrics in real-time, wherein the signal sensitivity defines a measure of how dependent the control logic for a particular actuator is upon a related control signal, wherein the actuator effectiveness is a measure of effectiveness of a related control logic that controls the particular actuators relative to a specific performance index, and wherein importance of related performance metrics in real-time defines a necessity of the related performance metric at a specific instant in time; and
wherein the signal criticality defines a sum of sensitivities of control methods to an input signal multiplied by a sum of effectivnesses of control methods for a vehicle performance metric, multiplied by the importance of related performance metrics in real-time.

12. The method of claim 11, further comprising:
defining a vehicle performance metric for each actuator configuration for the vehicle such that the vehicle performance metric comprises one of:
a no effect contribution towards a VMC objective;
a contribution of limited effectiveness towards the VMC objective; and
a contribution of high effectiveness towards the VMC objective, wherein the high effectiveness is greater than the limited effectiveness, and the limited effectiveness is greater than the no effect contribution towards the VMC objective; and
wherein each actuator configuration has a specific and distinct contribution to each performance metric, and each actuator configuration defines a distinct subset of actuators equipped to the vehicle and contributes in a distinct manner to VMC.

13. The method of claim 12, further comprising:
developing a VMC strategy that relates to current VMC objectives and the effectivenesses of control methods relative to performance metrics and associated VMC objectives, wherein the VMC strategy is based upon the real-time vehicle dynamic state, signal criticality, and signal reliability; and
ranking, with the VMC strategy, actuator control methods in relation to the current VMC objectives.

14. The method of claim 13, further comprising:
actively, continuously, and automatically determining when a reliability of one or more input signals is equal to or below a predetermined reliability threshold for one or more input signals with a criticality equal to or above a predetermined threshold criticality value; and
upon determining that the reliability of the one or more input signals is equal to or below the predetermined reliability threshold and that the criticality of the one or more input signals is equal to or above the predetermined threshold criticality value, actively, continuously, and automatically adapting by utilizing one or more alternate control methods having a reliability equal to or above the predetermined threshold for the criticality above the predetermined threshold criticality value; and
upon determining that the reliability of the one or more input signals is equal to or above the predetermined reliability threshold while the criticality is equal to or above the predetermined threshold, utilizing a highest-ranked control method applicable to the current VMC objectives.

15. The method of claim 14, further comprising:
determining that the reliability of the one or more input signals is equal to or below the predetermined reliability threshold and automatically transitions actuator control to one or more alternate actuator control methods that have decreased sensitivity to the one or more input signals that have been identified as having reliability below the predetermined reliability threshold relative to the highest-ranked control method for applicable to the current VMC objectives.

16. The method of claim 15, wherein the automatic transition between highest-ranked control method and one or more alternate actuator control methods is one or more of: automatic and instantaneous or automatic and gradual.

17. A method for vehicle motion control performance enhancement utilizing real-time data reliability and criticality assessments, the method comprising:
collecting, with a plurality of sensors disposed on a vehicle, real-time information about a dynamic state of the vehicle;
actively and continuously adjusting a dynamic state of the vehicle with a plurality of actuators disposed on the vehicle;
executing programmatic control logic including a vehicle motion control performance enhancement application (VMC application) stored in memory of a controller, the controller having a processor, a memory, and one or more input/output (I/O) ports, the I/O ports communicating with the plurality of sensors and the plurality of actuators, the VMC application including control logic comprising:
obtaining, from the plurality of sensors and from the plurality of actuators, the real-time information about the dynamic state of the vehicle, including measuring in real-time, with the plurality of sensors and the plurality of actuators, a position, a movement, and an acceleration of the vehicle in three or more degrees of freedom, wherein each real-time dynamic state estimation defines a distinct aspect of the dynamic state of the vehicle;
estimating a real-time vehicle dynamic state from the vehicle dynamic state information;
determining a signal criticality and a signal reliability for vehicle dynamic state information, wherein the signal criticality is based on signal sensitivity, actuator effectiveness of relevant actuators of the plurality of actuators, and importance of related performance metrics in real-time, wherein the signal sensitivity defines a measure of how dependent the control logic for a particular actuator is upon a related control signal, wherein the actuator effectiveness is a measure of effectiveness of a related control logic that controls the particular actuators relative to a specific performance index, and wherein importance of related performance metrics in real-time defines a necessity of the performance metric at a specific instant in time;
wherein the signal criticality defines a sum of sensitivities of control methods to an input signal multiplied by a sum of effectivnesses of control methods for a vehicle performance metric, multiplied by the importance of performance metrics in real-time;
defining a vehicle performance metric for each actuator configuration for the vehicle such that the vehicle performance metric comprises one of:
a no effect contribution towards a VMC objective;
a contribution of limited effectiveness towards the VMC objective; and
a contribution of high effectiveness towards the VMC objective, wherein the high effectiveness is greater than the limited effectiveness, and the limited effectiveness is greater than the no effect contribution towards the VMC objective; and
wherein each actuator configuration has a specific and distinct contribution to each performance metric, and each actuator configuration defines a distinct subset of actuators equipped to the vehicle and contributes in a distinct manner to VMC;
developing a VMC strategy that relates to current VMC objectives and the effectivenesses of control methods relative to performance metrics and associated VMC objectives, wherein the VMC strategy is based upon the real-time vehicle dynamic state, signal criticality, and signal reliability;

ranking, with the VMC strategy, actuator control methods in relation to the current VMC objectives;

executing the VMC strategy based on the real-time vehicle dynamic state, the signal criticality and the signal reliability;

actively, continuously, and automatically determining when a reliability of one or more input signals is equal to or below a predetermined reliability threshold for one or more input signals with a criticality equal to or above a predetermined threshold criticality value;

upon determining that the reliability of the one or more input signals is equal to or below the predetermined reliability threshold and that the criticality of the one or more input signals is equal to or above the predetermined threshold criticality value, actively, continuously, and automatically adapting by utilizing one or more alternate control methods having a reliability equal to or above the predetermined threshold for the criticality above the predetermined threshold criticality value;

upon determining that the reliability of the one or more input signals is equal to or above the predetermined reliability threshold while the criticality is equal to or above the predetermined threshold, utilizing a highest-ranked control method applicable to the current VMC objectives;

determining that the reliability of the one or more input signals is equal to or below the predetermined reliability threshold and automatically transitions actuator control to one or more alternate actuator control methods that have decreased sensitivity to the one or more input signals that have been identified as having reliability below the predetermined reliability threshold relative to the highest-ranked control method for applicable to the current VMC objectives, wherein the automatic transition between highest-ranked control method and one or more alternate actuator control methods is one or more of: automatic and instantaneous or automatic and gradual;

detecting and mitigating signal degradation by selectively enacting one or more alternate VMC strategies; and generating a VMC output command to the plurality of actuators based on the VMC strategy, wherein the VMC strategy actively, continuously, and automatically adapts to seamlessly overcome signal degradation by actively, continuously, and automatically executing a fusion strategy for degradation mitigation that utilizes weighted averages of actuator control methods to define the VMC output command to the plurality of actuators, wherein the VMC output command is calculated as:

III.

$$\text{Weight Index of a Control Method} = \left[\sum \begin{array}{c}\text{Sensitivity of}\\ \text{control method}\\ \text{to input signal}\end{array} \times \sum \begin{array}{c}\text{Reliability of}\\ \text{Input Signal}\end{array}\right] \times$$
$$\left[\sum \begin{array}{c}\text{Effectiveness of}\\ \text{control method}\\ \text{for performance}\\ \text{metric}\end{array} \times \sum \begin{array}{c}\text{Importance of}\\ \text{a performance}\\ \text{metric in real-time}\end{array}\right]$$

such that:

$$\text{Final Actuator Control Command} = \frac{\sum \begin{array}{c}\text{Weight Index of a}\\ \text{Control Method}\end{array} \times \sum \begin{array}{c}\text{Output of}\\ \text{Control Method}\end{array}}{\sum \begin{array}{c}\text{Weight Index of a}\\ \text{Control Method}\end{array}}$$

IV.

where the weight index for an actuator control method is calculated by multiplying the sensitivity of the control method by the reliability of the input signal and by the effectiveness of the actuator control method for a given actuator control algorithm, and multiplied further by the importance of a performance metric in real-time.

18. The method of claim 17, wherein the plurality of sensors comprises one or more of:

inertial measurement units (IMUs), suspension control units, semi active damping suspension (SADS), global positioning system (GPS) sensors, wheel speed sensors, throttle position sensors, accelerator pedal position sensors, brake pedal position sensors, steering position sensors, tire pressure monitoring sensors, aerodynamic element position sensors; and wherein the plurality of actuators comprises:

in-plane actuators comprising: all-wheel drive (AWD) actuators, electronic all-wheel drive (eAWD) actuators, limited slip differentials (LSDs), electronically-controlled LSDs (eLSD), active steering or electronic power steering (EPS) at either or both of front and rear axles of the vehicle; and out-of-plane actuators comprising: active aerodynamic actuators for one or more active aerodynamic elements including: spoilers, fans, suction devices, actively-managed Venturi tunnels, and splitters; active suspension actuators including magnetorheological dampers, and electrically, hydraulically, or pneumatically adjusted dampers or springs.

* * * * *